April 20, 1943.   G. A. STEVEN   2,317,339
AUTOMATIC SHIFT POWER TRANSMISSION
Filed Feb. 26, 1940   2 Sheets-Sheet 1

INVENTOR,
Glenn A. Steven.
BY Hovey & Hamilton,
ATTORNEYS.

Patented Apr. 20, 1943

2,317,339

UNITED STATES PATENT OFFICE 2,317,339

AUTOMATIC SHIFT POWER TRANSMISSION

Glenn A. Steven, Kansas City, Kans., assignor to The Electro Glide Company, Inc., Kansas City, Kans., a corporation of Kansas Application February 26, 1940, Serial No. 320,769

2 Claims. (Cl. 74—230.17)

This invention relates to improvements in automatic shift power transmissions and particularly to transmissions of the character wherein expansible V-pulleys are associated with a V-belt to provide a variable drive ratio.

The primary object of the present invention is the provision of an organization of the above character wherein centrifugal governing means is provided to vary the drive ratio with the variation of the speed of the driven member.

Another object of the invention is the provision of an automatic shift power transmission of the character described wherein is provided automatic governing means whereby the effective pitch diameter of the driving and driven pulleys are determined by the current speed of the driven shaft.

Other objects are simplicity and economy of construction, efficient operation, and adaptability for use with various types of transmissions.

Minor objects and advantages of the invention will become apparent during the course of the specification, where reference is had to the drawings in which.

Figures 1, 2:
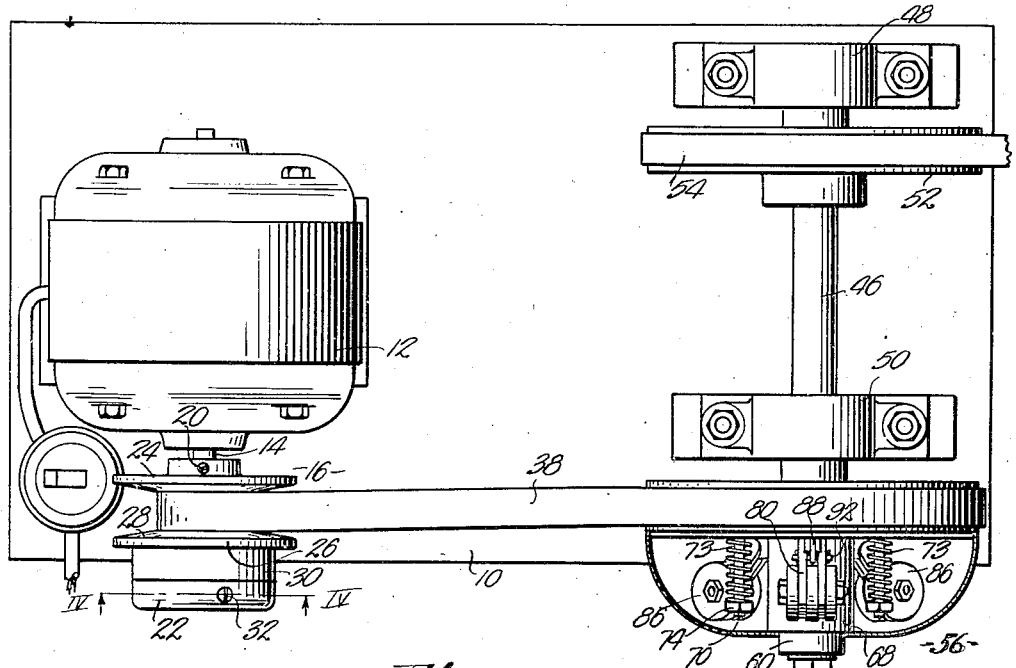
Figure 1 is a plan view of a transmission assembly embodying this invention.
Fig. 2 is a side elevation of the transmission with a portion removed and the belt shown in the normal rest position in solid lines, and in a driving position in dotted lines.

Throughout the several views, like reference characters refer to similar parts and the numeral 10 designates a base on which is securely mounted an electric motor 12 having a shaft 14.

Figure 3:
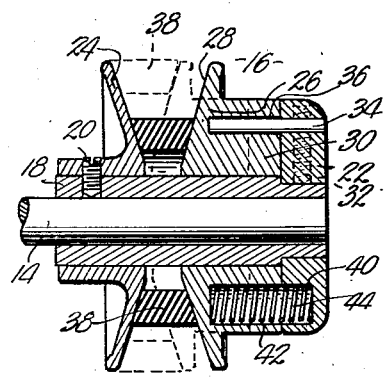
Fig. 3 is an enlarged central sectional view of the driving pulley.
Figure 4:
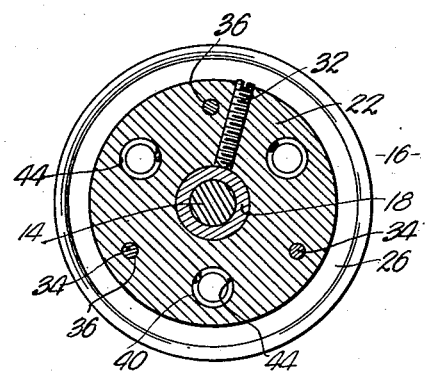
Fig. 4 is an enlarged sectional view of the driving pulley taken on line IV—IV of Fig. 1.

On shaft 14 is mounted a drive pulley 16 of the adjustable V-type shown in detail in Figs. 3 and 4.

A sleeve 18 closely fitted on motor shaft 14 and secured thereto by means of set screw 20, serves to carry rigidly attached end flange member 22 and the cone faced disc 24 which is also secured in a fixed relative position by means of the screw 20. Slidably mounted on sleeve 18 is a disc member 26 having a cone face 28 and a hub 30 The flange member 27 is shown secured to sleeve 18 by means of set screw 32 but may be integral therewith or otherwise secured against relative movement.

The three spaced apart axially disposed pins 34 carried by flange 22 are slidably fitted in holes 36 formed in disc 26 and permit of axial movement of the disc and also prevent relative rotary movement of the discs 24 and 26 which constitute the V-groove to receive the endless V-belt 38.

Axially registered recesses 40 and 42 formed in flange 22 and disc 26 respectively, are adapted to receive the spring 44 under compression to normally hold the cone faced discs in the closed position, as shown in dotted lines in Fig. 3. When sufficient tension is exerted on belt 38, the disc 26 will be forced away from disc 24 and the radius of the belt track will be decreased, thereby increasing the driving power of the motor 12.

Shaft 46 mounted for rotation in journals 48 and 50 and disposed in substantially parallel relation with motor shaft 14, is provided with a power take-off pulley 52 to drive belt 54 which in turn is operatively associated with mechanism to be driven.

An adjustable V-pulley 56 mounted for rotation with shaft 46 is in substantial alignment with drive pulley 16. This V-pulley is the driven pulley which constitutes the principal feature of the invention, is best shown in Figs. 2, 5, 6 and 7.

A disc 58 having an elongated hub 60 is securely affixed to shaft 46 by key 62 and is provided with a cone face 64 which serves as one side of the V-belt track. A disc 66 having a hub 68 is slidably mounted on hub 60 and is secured against rotation relative thereto by stud bolts 70, which are mounted in disc 58 and extend through holes 72 formed through disc 66.

Figure 5:
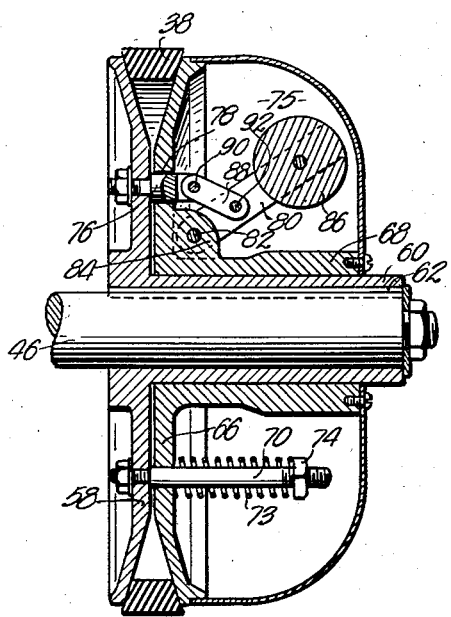
Fig. 5 is an enlarged central sectional view of the driven pulley taken on line V—V of Fig. 2 with the parts in the normal, at rest position.
Figure 6:
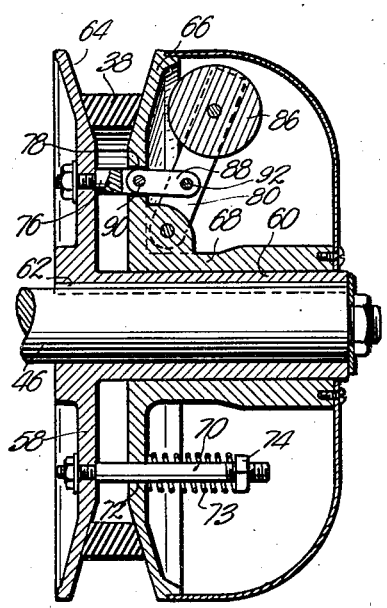
Fig. 6 is an enlarged view similar to that shown in Fig. 5.
Figure 7:
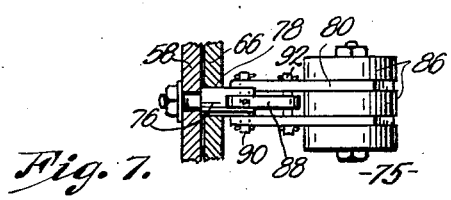
Fig. 7 is a fragmentary plan view showing the governor unit.

A spring 73 mounted on stud bolt 70 outside disc 66 is adapted to be tensioned by nut 74 to normally secure the discs 58 and 66 in the closed position, as shown in Fig. 5 to produce a belt track adjacent the outer periphery of the cone surfaces.

The relative relation of the discs 58 and 66 whereby the effective belt track is located, is determined by the following governor, comprising a plurality of units 75, each of which comprises a post 76 secured to disc 58 in parallel relation to shaft 46 and extended through an opening 78 formed through disc 66.

A pair of arms 80 pivoted at 82 to ear 84, which is integral with disc 66, is provided at its free end with a weight 86. A link 88 is pivoted at its one end by rivet 90 to post 76 and at its other end to arms 80 by rivet 92. When the pulley is at rest, as shown in Fig. 5, the springs 73 force the two pulley discs together and hold the governor weights in the retracted position. As the pulley is rotated, the centrifugal force of weights 86 will force the discs apart to change the effective belt track to a less diameter.

By adjusting the tension of springs 73, it is apparent that the ultimate rate of rotation of shaft 46 may be determined.

It will be noted that three stud bolts 70 and three governor units 75 are provided in equally spaced relation about shaft 46 to present a balanced structure, however, many other arrangements of the parts might be substituted without departing from the spirit of the invention.

It is very apparent that with the pulleys and belt constructed as just described, any reduction in the belt track of the pulley 56 will cause a shifting of the belt to permit an increase in the diameter of belt track of the drive pulley 16. The springs 44 constantly urge the cone surfaces of the V-pulley toward each other.

The operation of the transmission is as follows:

Considering the motor 12 to be of substantially uniform speed, it will be noted that when the motor is started, the effective driving track of the drive pulley 16 is of a minimum radius, while the effective driving track of the driven pulley 56 is at a maximum. The starting load is much greater than the running load, therefore, with the pulleys set as described above, the power ratio is such that the motor will start the load and as the speed of rotation of shaft 46 is increased, the governors will act to spread the pulley discs apart at the driven pulley and permit the belt to shift, thereby causing the discs of the driving pulleys to converge through the action of springs 44, thereby reducing the power ratio with the belt in the position shown in dotted lines in Fig. 2. Should the driven load be increased and the speed of rotation of shaft 46 decreased, then by the action of governors the power ratio will be increased to take care of this added load.

While the position of the parts of pulley 56 are as shown in Fig. 5, when the pulley is at rest, yet the driving position may be at any point intermediate this position and the minimum driving speed position depending upon the load.

By means of this governed transmission, it is apparent that when the greatest load is to be moved by the driving power, the pulley drive ratio is the greatest, thus facilitating proper application of the power to the load.

Having thus described the invention, what is claimed as new and desired to be secured by Letters Patent is:

1. In a device of the character described, a V-shaped pulley comprising a fixed cone-shaped disc having an elongated hub, a movable cone-shaped disc mounted for axial adjustment on said hub and cooperating with said fixed disc to present a V-belt tract, axially disposed pins secured to one of said discs and slidably mounted through holes formed through the other of said discs to preclude relative rotary movement of the discs, compression springs mounted on said pins to constantly urge said discs toward each other, axially disposed posts carried by one of said discs and extending through holes in the other of said discs, centrifugally governing means including a plurality of levers pivoting at their one end to one of said discs and having weights at their free ends, a link pivotally connecting each of said levers with one of said posts whereby as the speed of said pulley is varied, the distance between said discs will be varied.

2. In a device of the character described, a V-shaped pulley comprising a fixed cone-shaped disc having an elongated hub, a movable cone-shaped disc mounted for axial adjustment on said hub and cooperating with said fixed disc to present a V-belt track, axially disposed pins secured to said fixed disc and slidably mounted through holes formed through said disc to preclude relative rotary movement of the discs, compression springs adjustably mounted on said pins to constantly urge said discs toward each other, axially disposed posts carried by said fixed disc and extending through holes in said movable disc, centrifugally governing means including a plurality of levers pivoting at their one end to said movable disc and having weights at their free ends, a link pivotally connecting each of said levers with one of said posts whereby as the speed of the pulley is increased, the governing means will force the discs farther apart.

GLENN A. STEVEN.